(12) United States Patent
Zhang et al.

(10) Patent No.: US 10,853,660 B2
(45) Date of Patent: Dec. 1, 2020

(54) METHOD AND APPARATUS FOR RETRIEVING SIMILAR VIDEO AND STORAGE MEDIUM

(71) Applicant: Tencent Technology (Shenzhen) Company Limited, Shenzhen (CN)

(72) Inventors: Yuanyuan Zhang, Shenzhen (CN); Qun Yu, Shenzhen (CN); Fei Zhan, Shenzhen (CN); Xiao Hua, Shenzhen (CN); Wengsan Cheong, Shenzhen (CN); Lei Xiong, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 20 days.

(21) Appl. No.: 16/509,289

(22) Filed: Jul. 11, 2019

(65) Prior Publication Data
US 2019/0332867 A1    Oct. 31, 2019

Related U.S. Application Data

(63) Continuation of application No. PCT/CN2018/084580, filed on Apr. 26, 2018.

(30) Foreign Application Priority Data

May 11, 2017    (CN) .......................... 2017 1 0331203

(51) Int. Cl.
*G06K 9/46*    (2006.01)
*G06K 9/00*    (2006.01)
(Continued)

(52) U.S. Cl.
CPC ..... *G06K 9/00744* (2013.01); *G06F 16/5846* (2019.01); *G06F 16/5866* (2019.01); *G06K 9/00758* (2013.01); *G06K 9/6256* (2013.01)

(58) Field of Classification Search
CPC .......... G06K 9/00744; G06K 9/00758; G06K 9/6256; G06F 16/5866; G06F 16/5846
(Continued)

(56) References Cited

FOREIGN PATENT DOCUMENTS

| CN | 101976258 A | 2/2011 |
|---|---|---|
| CN | 106326388 A | 1/2017 |

(Continued)

OTHER PUBLICATIONS

Tencent Technology, ISRWO, PCT/CN2018/084580, dated Aug. 7, 2018, 6 pgs.

(Continued)

*Primary Examiner* — Stephen P Coleman
(74) *Attorney, Agent, or Firm* — Morgan, Lewis & Bockius LLP

(57) ABSTRACT

Embodiments of this application disclose a method for retrieving similar videos performed at a computing device. The computing device obtains video information of a video for which similar videos are to be retrieved, the video information including a video tag and a video title, and trains the video information by using a preset text depth representation model, to convert the video information into a word vector. After selecting, from a video library according to a preset knowledge graph, videos matching the video information, to obtain a first candidate video set, the computing device screens, in the video library, videos similar to the video information according to the word vector, to obtain a second candidate video set and then determines a similar video for the video information from the first candidate video set and the second candidate video set.

20 Claims, 6 Drawing Sheets

(51) Int. Cl.
  *G06F 16/58* (2019.01)
  *G06F 16/583* (2019.01)
  *G06K 9/62* (2006.01)

(58) Field of Classification Search
  USPC ........................................................ 382/190
  See application file for complete search history.

(56) References Cited

FOREIGN PATENT DOCUMENTS

CN 107066621 A 8/2017
JP 2007200249 A 8/2007

OTHER PUBLICATIONS

Tencent Technology, IPRP, PCT/CN2018/084580, dated Nov. 12, 2019, 5 pgs.

METHOD AND APPARATUS FOR RETRIEVING SIMILAR VIDEO AND STORAGE MEDIUM

CROSS-REFERENCE TO RELATED APPLICATIONS

This application is a continuation application of PCT/CN2018/084580, entitled "METHOD AND APPARATUS FOR RETRIEVING SIMILAR VIDEOS AND STORAGE MEDIUM" filed on Apr. 26, 2018, which claims priority to Chinese Patent Application No. 201710331203.2, entitled "METHOD AND APPARATUS FOR RETRIEVING SIMILAR VIDEOS AND STORAGE MEDIUM" filed with the Chinese Patent Office on May 11, 2017, all of which are incorporated by reference in their entirety.

FIELD OF THE TECHNOLOGY

This application relates to the field of communications technology, and specifically, to a method and apparatus for retrieving similar videos and a storage medium.

BACKGROUND OF THE DISCLOSURE

In the era of information explosion, faced with massive videos, how to accurately and comprehensively retrieve similar videos has positive significance for scenarios such as user query and video information recommendation.

When similar videos are retrieved, a text depth representation model (word2vec) is generally used for modeling, and then similarity of video titles is calculated based on the model, and similar videos are searched according to the similarity. Corpora training the word2vec model mainly come from a network. If the corpora are updated, the word2vec model needs to be retrained.

SUMMARY

Embodiments of this application provide a method and apparatus for retrieving similar videos and a storage medium, not only to improve recall and accuracy of a retrieval result but also to reduce frequency of model training and save computing resources.

According to a first aspect of this application, an embodiment of this application provides a method for retrieving similar videos performed at a computing device having one or more processors and memory storing a plurality of programs to be executed by the one or more processors, the method comprising:

obtaining video information of a video for which similar videos are to be retrieved, the video information comprising a video tag and a video title;

selecting, from a video library according to a preset knowledge graph, videos matching the video information, to obtain a first candidate video set;

training the video information by using a preset text depth representation model, to convert the video information into a word vector;

screening, in the video library, videos similar to the video information according to the word vector, to obtain a second candidate video set; and determining a similar video for the video information from the first candidate video set and the second candidate video set.

According to a second aspect of this application, an embodiment of this application provides a computing device comprising one or more processors, memory coupled to the one or more processors and a plurality of programs stored in the memory that, when executed by the one or more processors, cause the computing device to perform the aforementioned method for retrieving similar videos.

According to a third aspect of this application, an embodiment of this application provides a non-transitory computer readable storage medium storing a plurality of machine readable instructions in connection with a computing device having one or more processors. The plurality of machine readable instructions, when executed by the one or more processors, cause the terminal to perform the aforementioned method for retrieving similar videos.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

The following clearly and completely describes the technical solutions in the embodiments of the present application with reference to the accompanying drawings in the embodiments of the present application. Apparently, the described embodiments are some embodiments of the present application rather than all of the embodiments. All other embodiments obtained by a person skilled in the art based on the embodiments of this application without creative efforts shall fall within the protection scope of this application.

A conventional method for retrieving similar videos is greatly dependent on a word segmentation effect, magnitude of a corpus, and timeliness of corpus update. If corpus update is not timely, for some video information that newly appears, a correct word segmentation result may not be obtained, affecting a training result of a word2vec model, and finally resulting in relatively low recall (R, Recall, also referred to as recall) and an inaccurate retrieval result. If a corpus update frequency is too large, it takes a lot of training time and computing resources, resulting in serious resource waste.

In view of the above, embodiments of this application provide a method and apparatus for retrieving similar videos and a storage medium, not only to improve recall and accuracy of a retrieval result but also to reduce frequency of model training and save computing resources.

Figure 1A:
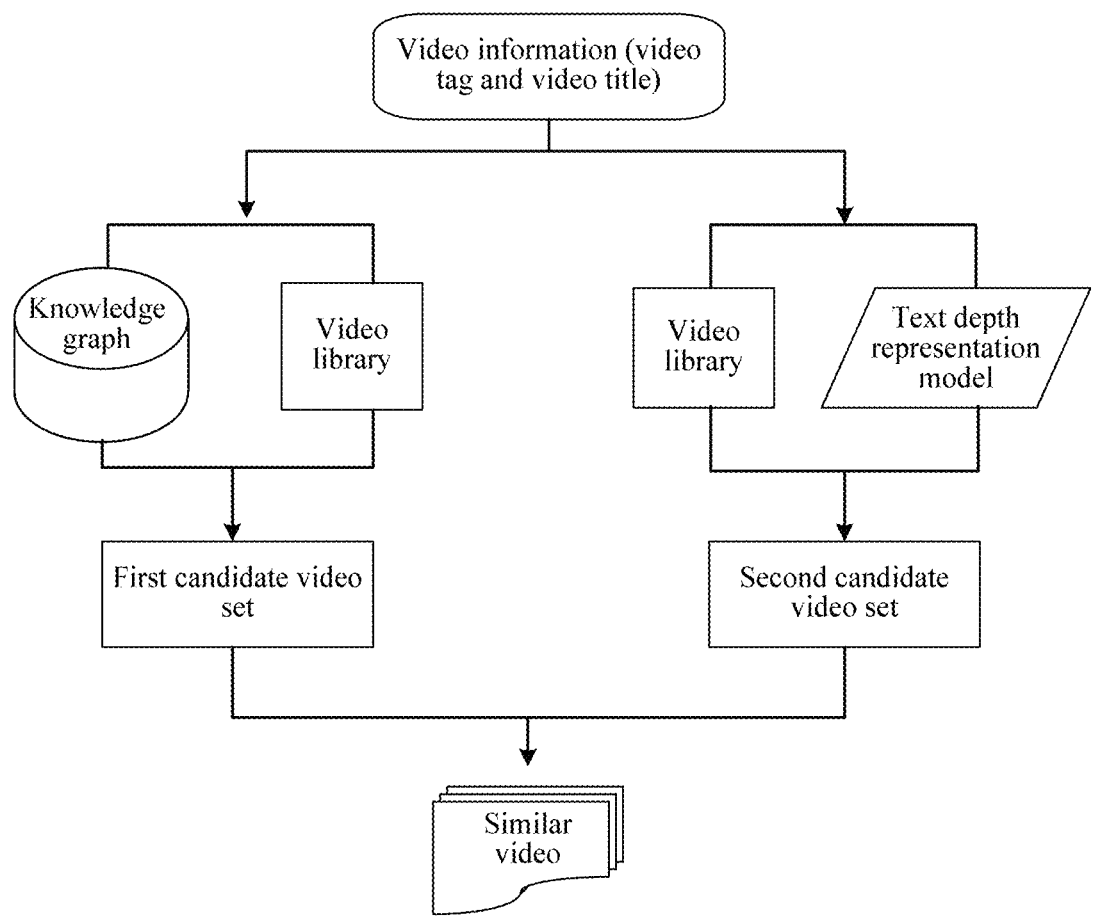
FIG. 1a is a schematic scenario diagram of a method for retrieving similar videos according to an embodiment of this application.
Figure 1B:
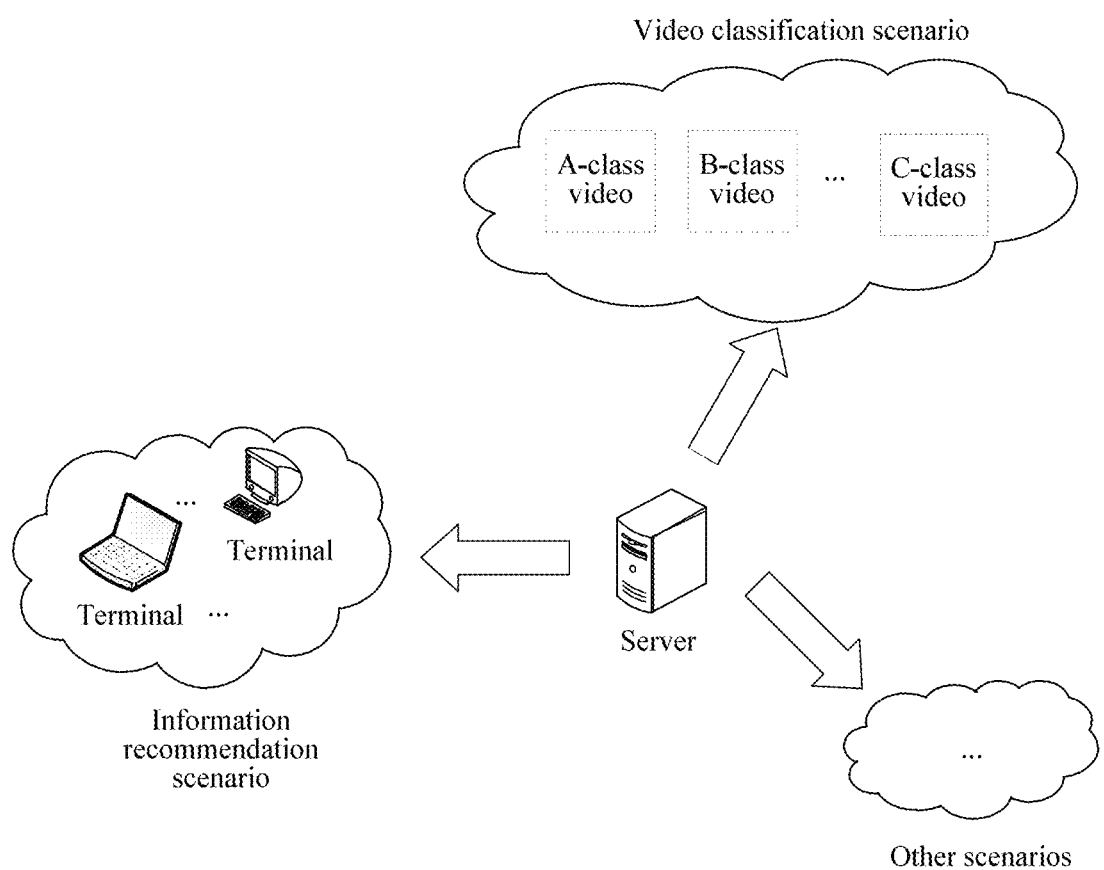
FIG. 1b is another schematic scenario diagram of a method for retrieving similar videos according to an embodiment of this application.

The apparatus for retrieving similar videos may be specifically integrated in a computing device such as a server or a terminal. For example, using an example in which the apparatus for retrieving similar videos is integrated in the server, referring to FIG. 1a, after the server obtains video information, such as a video tag and a video title, of a similar video to be retrieved, on one hand, the server may obtain, from a video library according to a preset knowledge graph, videos matching the video information, to obtain a first candidate video set, and on the other hand, the server may train the video information by using a preset word2vec model (a text depth representation model), to convert the video information into a word vector, screen, in the video library, videos similar to the video information according to the word vector, to obtain a second candidate video set, and determine a similar video for the video information from the first candidate video set and the second candidate video set. Afterward, the similar video may be provided to a plurality of scenarios for use. For example, referring to FIG. 1b, the similar video may be provided or recommended to a user, the video is classified in this manner, or the like.

Detailed descriptions are separately provided below.

This embodiment is described from the perspective of an apparatus for retrieving similar videos, and the apparatus for retrieving similar videos may be specifically integrated in a computing device such as a server or a terminal.

A method for retrieving similar videos, applied to a computing device, includes: obtaining video information of a video for which similar videos are to be retrieved, the video information including a video tag and a video title; obtaining, from a video library according to a preset knowledge graph, videos matching the video information, to obtain a first candidate video set; training the video information by using a preset word2vec model, to convert the video information into a word vector; screening, in the video library, videos similar to the video information according to the word vector, to obtain a second candidate video set; and determining a similar video for the video information from the first candidate video set and the second candidate video set.

Figure 1C:
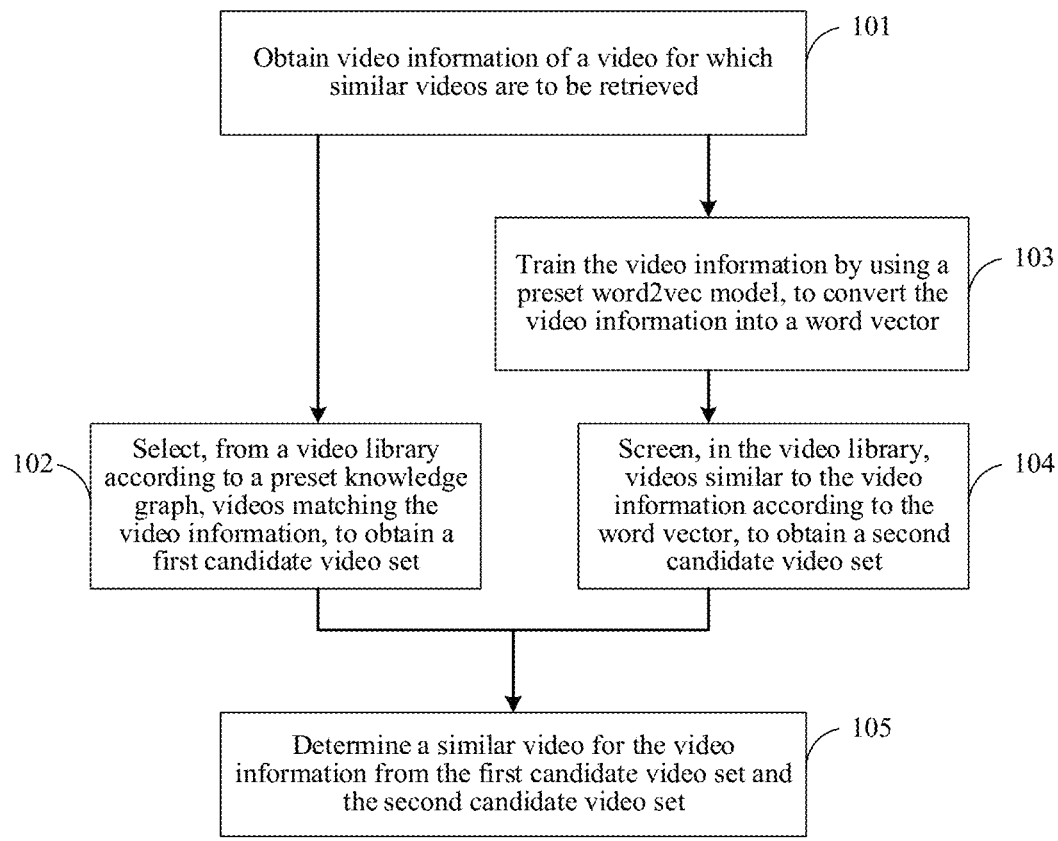
FIG. 1c is a flowchart of a method for retrieving similar videos according to an embodiment of this application.

As shown in FIG. 1c, a specific process of the method for retrieving similar videos may be as follows:

Step 101: Obtain video information for which similar videos are to be retrieved.

For example, the apparatus for retrieving similar videos may receive a retrieval request sent by a terminal. The retrieval request indicates the video information for which the similar videos are to be retrieved. Alternatively, when the video needs to be classified, a local device (that is, the apparatus for retrieving similar videos) or another device generates the corresponding retrieval request, and then apparatus for retrieving similar videos obtains the video information for which the similar videos are to be retrieved according to the retrieval request.

The video information may include information such as a video tag and a video title. The video tag refers to information that may be used for representing video content and/or a video type, and may be, for example, a film, a drama, a comedy, and an adventure. In some embodiments of this application, the video tag may also be information that has an association relationship with the video, such as a star, a director, a scenic spot, or a production company. The video title refers to title content of the video and may specifically include letters and symbols in the title.

Step 102: Obtain, from a video library according to a preset knowledge graph, videos matching the video information, to obtain a first candidate video set, which may be, for example, specifically as follows:

(1) Extract an entity word from the video tag and the video title, to obtain a seed (also referred to as seed words).

The entity word refers to a word that has a particular meaning, and may be specifically a term that can refer to an object, such as San Zhang or XX drama.

(2) Obtain, from the video library according to the preset knowledge graph, videos matching the seed, to obtain the first candidate video set.

The video library stores a plurality of videos. Each video has corresponding video information. The video information may include information such as a video tag and a video title.

For example, an entity word having a strong association relationship with the seed may be specifically determined according to the preset knowledge graph, the entity word is determined as a candidate word; and videos whose video information includes the candidate word are obtained from the video library, to obtain the first candidate video set.

The strong association relationship means that a relationship degree is less than or equal to a set value. That is, if a relationship degree between an entity word and the seed is less than or equal to the set value, it indicates that the entity word and the seed have a strong association relationship, that is, the step of "determining an entity word having a strong association relationship with the seed according to the preset knowledge graph and determining the entity word as a candidate word" may include:

mapping the seed onto entity words in a preset entity library; determining relationship degrees between the seed and the entity words in the entity library; and selecting an entity word whose relationship degree is less than or equal to a set value as the candidate word, where the entity library may be established according to the preset knowledge graph.

The set value may be set according to requirements of actual applications. For example, an entity whose relationship degree is one degree or two degrees may be generally referred to as an entity having a "close" relationship. Therefore, one degree may be used as the set value.

For example, the seed may be mapped onto a corresponding entity in a preset knowledge base by using a named entity linking (NEL) technology or the like, then a quantity of relationship sides between the seed and another entity in the knowledge base is obtained, to obtain a relationship degree between the seed and the another entity in the knowledge base.

Named entity linking is referred to as entity linking for short, is a process of linking a seed to an unambiguous entity in a knowledge base, and includes emergence of synonymous entities, disambiguation of ambiguous entities, and the like.

The quantity of relationship sides is used for describing proximity of association relationships between entities, is a quantity of relationship sides that need to be passed from an entity A to an entity B in an entity relationship diagram, and may be represented as degrees. For ease of description, in this embodiment of this application, the degree is referred to as a relationship degree. A smaller quantity of relationship sides indicates a lower relationship degree (that is, a degree), and a lower relationship degree indicates that one entity is closer to itself. For example, if an entity approaches itself, a relationship degree thereof (a degree) is 0. Details are not described herein.

In some embodiments of this application, the entity library may be preset by operation and maintenance personnel or may be established by the apparatus for retrieving similar videos. That is, before the step of "mapping the seed onto entity words in a preset entity library", the method for retrieving similar videos may further include:

setting a basic thesaurus; obtaining Internet information according to the basic thesaurus and performing non-entity word cleaning on the Internet information; and constructing a triple relationship between the entity words according to the basic thesaurus and cleaned Internet information, to obtain the entity library.

For example, basic classifying entity words may be obtained from cell thesauri of some applications. For example, a star, a film, or the like is used as a basic thesaurus, and then Internet information is obtained according to the basic thesaurus. For example, some web pages containing encyclopedia data may be obtained, non-entity words in these web pages are cleaned, and triple relationships, such as (<San Zhang, Star>, <belong to>, <ABCD, drama>) between entity words are constructed, to obtain an entity library in which these triple relationships are stored.

It should be noted that to ensure accuracy of a retrieval result, the basic thesaurus and the Internet information may be updated periodically or in real time, to update the entity library. During specific update, the entity library may be established in the foregoing manner, or difference update may be performed. That is, newly added information may be first analyzed, to determine whether an entity word contained in the newly added information already exists in the entity library. If the entity word contained in the newly added information already exists in the entity library, the newly added information does not need to be added to the entity library. Otherwise, if the entity word contained in the newly added information does not exist in the entity library, it indicates that the entity word contained in the newly added information is a new entity word. In this case, the corresponding Internet information may be obtained, non-entity word cleaning is performed on the Internet information, then a triple relationship between the new entity word and an entity word in cleaned Internet information is constructed, and the constructed triple relationship is added to the entity library.

Step 103: Train the video information by using a preset word2vec model, to convert the video information into a word vector.

For example, word segmentation may be specifically performed on the video tag, the video title, and the like, to obtain video text after word segmentation, and the video text after word segmentation is trained by using the preset word2vec model, to obtain a word vector of the video text after word segmentation, that is, obtain a word vector corresponding to each word in the video text after word segmentation.

The word vector, as the name suggests, refers to expressing a word by using a vector. It should be noted that the word vector that corresponds to each word and that is obtained through training has a fixed dimension. In this way, dimension explosion can be effectively prevented, and subsequent similarity calculations can be reduced.

The word2vec model may be preset by operation and maintenance personnel or may be pre-established by the apparatus for retrieving similar videos. That is, before the step of "training the video text after word segmentation by using the preset word2vec model", the method for retrieving similar videos may further include:

obtaining a preset corpus set and performing word segmentation on a sentence in the corpus set; and learning a preset original model according to a sentence after word segmentation, to obtain the word2vec model.

Content in the corpus set may be set according to requirements of actual applications. For example, user generated content (UGC) within a period may be sampled, and network information such as various encyclopedia corpora may be captured, to construct the corpus set.

It should be noted that step 102 and step 103 may not be implemented in a particular order.

Step 104: Screen, in the video library, videos similar to the video information according to the word vector, to obtain a second candidate video set.

For example, if in step 103, the word vector of the video text after word segmentation is obtained through training, in this case, the videos similar to the video information may be screened in the video library according to the word vector of the video text after word segmentation, to obtain the second candidate video set. For example, details may be as follows:

calculating similarity between the video information and each video in the video library according to the word vector of the video text after word segmentation; and selecting videos whose similarity is higher than a preset threshold, to obtain the second candidate video set.

The preset threshold may be set according to requirements of actual applications. Similarity between two videos may be obtained by calculating a dot product of word vectors of the two videos or may be calculated according to another similarity algorithm. Details are not described herein.

Step 105: Determine a similar video for the video information from the first candidate video set and the second candidate video set.

For example, videos in the first candidate video set and the second candidate video set are specifically scored, a comprehensive score value of each video is calculated according to scores, and then, a video having a relatively high comprehensive score value, such as a video whose comprehensive score value is greater than a preset score value, is determined as the similar video for the video information.

In some embodiments of this application, to improve flexibility, fine tuning is performed by respectively setting corresponding weights for the videos in the first candidate video set and the second candidate video set, so that a retrieval result is more accurate. That is, the step of "determining a similar video for the video information from the first candidate video set and the second candidate video set" may include:

scoring each video in the first candidate video set, to obtain a first score value; scoring each video in the second candidate video set, to obtain a second score value; respectively calculating weighted values of the first score value and the corresponding second score value, to obtain a comprehensive score value of each video; and determining a video whose comprehensive score value is greater than a preset score value as the similar video for the video information, where this may be represented by a formula as follows:

$$S=\alpha*A+\beta*B, \text{ where}$$

S is a comprehensive score value of a video X, A is a first score value of the video X in the first candidate video set, B is a second score value of the video X in the second candidate video set, α is a weight (that is, a weight of a video in the first candidate video set) of the first score value, β is a weight (that is, a weight of a video in the second candidate video set) of the second score value, a sum of α and β is 1, and specific values of α and β may be set through requirements of actual applications, such as through feedback of a user.

It should be noted that score ranges of the first score value and the second score value may be set according to requirements of actual applications, and may be set, for example, between [0,1]. In addition, it should be further noted that if the second candidate video set does not have the video X, the second score value of the video X is 0; similarly, if a video L in the second candidate video set is not in the first candidate video set, a first score value of the video L is 0.

It can be learned from the above that in this embodiment, after the video information for which the similar videos are to be retrieved is obtained, on one hand, the videos matching the video information may be obtained from the video library according to the preset knowledge graph, to obtain the first candidate video set; on the other hand, the video information may be trained by using the preset word2vec model, and the videos similar to the video information are screened in the video library according to a training result, to obtain the second candidate video set, and then similar video for the video information is determined according to the first candidate video set and the second candidate video set, to retrieve the similar video. Because in the solution, the similar video is retrieved by using a solution of combining the knowledge graph and a text similarity, the knowledge graph may be used to fix problems of low recall and large computing resource consumption caused by corpus update frequency and quantity problems, similarity calculation may be used to add context information of a requested video (that is, a video to be retrieved), and a problem of recall result deviation caused by polysemy is stipulated. Therefore, the solution not only improves recall and accuracy of a retrieval result but also reduces frequency of model training and saves computing resources.

According to the method described in the foregoing embodiment, the following further provides detailed descriptions by using an example.

In this embodiment, the descriptions are provided by using an example in which the apparatus for retrieving similar videos is specifically integrated in a server.

Figure 2A:
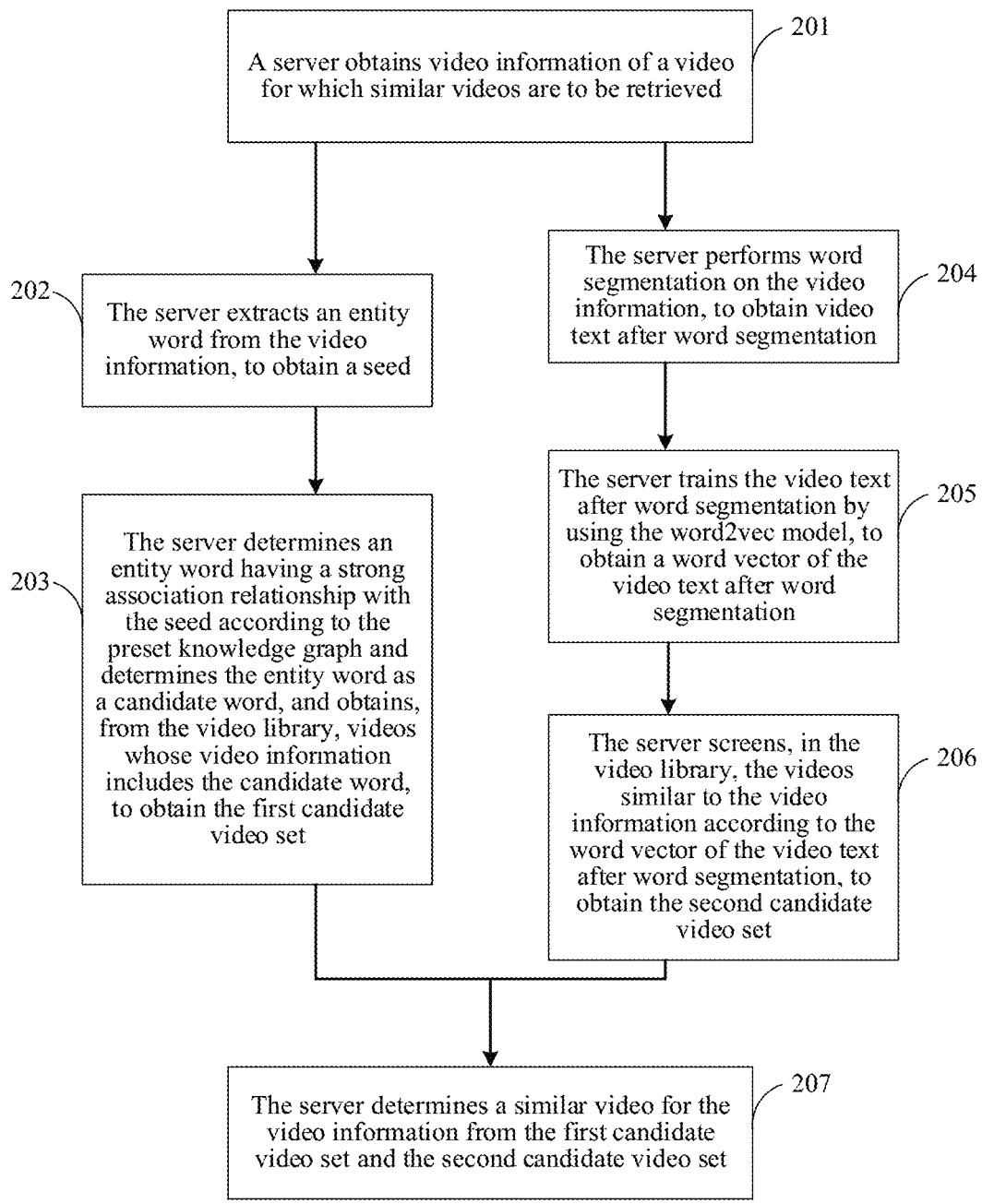
FIG. 2a is another flowchart of a method for retrieving similar videos according to an embodiment of this application.

A method for retrieving similar videos is shown in FIG. 2a, and a specific process may be as follows:

Step 201: A server obtains video information for which similar videos are to be retrieved.

For example, the server may specifically receive a retrieval request sent by a terminal. The retrieval request indicates the video information for which the similar videos are to be retrieved. Alternatively, when the server needs to classify the video, a local device (that is, the server) or another device may generate the corresponding retrieval request, and then the server obtains the video information for which the similar videos are to be retrieved according to the retrieval request.

The video information may include information such as a video tag and a video title. The video tag refers to information that may be used for representing video content and/or a video type, and may be, for example, a film, a drama, a comedy, and an adventure. In some embodiments of this application, the video tag may also be information that has an association relationship with the video, such as a star, a director, a scenic spot, or a production company. The video title refers to title content of the video and may specifically include letters and symbols in the title.

Step 202: The server extracts an entity word from the video information, such as the video tag and the video title, to obtain a seed.

For example, it is assumed that the similar video to be retrieved is a video K, the video K is a costume drama "Nirvana XX Fire", and a video title thereof is "Nirvana XX Fire Episode 1", and video tags are "costume", "drama", and the like. In this case, entity words, such as "Nirvana XX Fire", "costume", and "drama", are extracted from the video title and the video tags of the video K, to obtain a seed.

Step 203: The server determines an entity word having a strong association relationship with the seed according to the preset knowledge graph and determines the entity word as a candidate word, and obtains, from the video library, videos whose video information includes the candidate word, to obtain the first candidate video set.

The strong association relationship means that a relationship degree is less than or equal to a set value. That is, if a relationship degree between an entity word and the seed is less than or equal to the set value, it indicates that the entity word and the seed have a strong association relationship. For example, words consistent with the seed, such as a near-synonym and a synonym of the seed, and words that have particular relationships with the seed may be all considered to have a strong association relationship with the seed. That is, the step of "determining, by the server, an entity word having a strong association relationship with the seed according to the preset knowledge graph and determining the entity word as a candidate word" may include:

mapping, by the server, the seed onto entity words in a preset entity library; determining relationship degrees between the seed and the entity words in the entity library; and selecting an entity word whose relationship degree is less than or equal to a set value as the candidate word.

The set value may be set according to requirements of actual applications, and the entity library may be established according to the preset knowledge graph. For example, the seed may be mapped onto a corresponding entity in a preset knowledge base by using an NEL technology or the like, then a quantity of relationship sides between the seed and another entity in the knowledge base is obtained, to obtain a relationship degree between the seed and the another entity in the knowledge base.

Figure 2B:
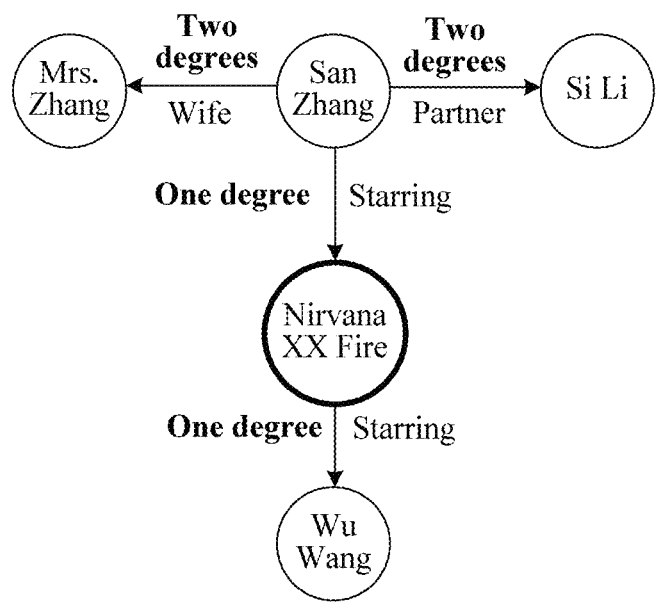
FIG. 2b is an example diagram of relationship sides in a method for retrieving similar videos according to an embodiment of this application.

For example, still using the seed "Nirvana XX Fire" of the video K as an example, as shown in FIG. 2b, because stars "San Zhang" and "Wu Wang" star the drama "Nirvana XX Fire", a wife of "San Zhang" is "Mrs. Zhang", and a partner is "Si Li", a quantity of relationship sides between the seed "Nirvana XX Fire" and the entity word "Wu Wang" is "1", and a corresponding relationship degree is one degree. A quantity of relationship sides between the seed "Nirvana XX Fire" and the entity word "San Zhang" is "1", and a corresponding relationship degree is one degree. A quantity of relationship sides between the seed "Nirvana XX Fire" and the entity word "Mrs. Zhang" is "2", and a corresponding relationship degree is two degrees. A quantity of relationship sides between the seed "Nirvana XX Fire" and the entity word "Si Li" is "2", and a corresponding relationship degree is two degrees. If the set value that is set is one degree, in this case, "San Zhang" and "Wu Wang" may be used as candidate words.

In some embodiments of this application, the entity library may be preset by operation and maintenance personnel or may be established by the server. For example, details may be as follows:

setting, by the server, a basic thesaurus; obtaining Internet information according to the basic thesaurus and performing non-entity word cleaning on the Internet information; and constructing a triple relationship between the entity words according to the basic thesaurus and cleaned Internet information, to obtain the entity library.

For example, basic classifying entity words may be obtained from cell thesauri of some applications. For example, a star, a film, or the like is used as a basic thesaurus, and then Internet information is obtained according to the basic thesaurus. For example, some web pages containing encyclopedia data may be obtained, non-entity words in these web pages are cleaned, and triple relationships, such as (<San Zhang, Star>, <belong to>, <Nirvana XX Fire, drama>) between entity words are constructed, to obtain an entity library in which these triple relationships are stored.

It should be noted that to ensure accuracy of a retrieval result, the basic thesaurus and the Internet information may be updated periodically or in real time, to update the entity library. For details, refer to descriptions in the foregoing embodiment. Details are not described herein again.

Step 204: The server performs word segmentation on the video tag and the video title, to obtain video text after word segmentation.

For example, still using the video K as an example, if the video title of the video K is "Nirvana XX Fire Episode 1", and the video tags are "costume", "drama", and the like, word segmentation may be performed on these texts. For example, the video title "Nirvana XX Fire Episode 1" is divided into "Nirvana XX Fire" and "Episode 1", the video tag "costume" is divided into "costume", the video tag "drama" is divided into "drama", and the like, to obtain video text after word segmentation.

It should be noted that step 202 and step 204 may not be implemented in a particular order.

Step 205: The server trains the video text after word segmentation by using the preset word2vec model, to obtain a word vector of the video text after word segmentation.

For example, if in step 204, the obtained video text after word segmentation includes ""Nirvana XX Fire", "Episode 1", "costume", and "drama", in this case, these segmented words may be separately trained by using the preset word2vec model, to obtain word vectors corresponding to the segmented words.

The word2vec model may be preset by operation and maintenance personnel or may be pre-established by the apparatus for retrieving similar videos. For example, the server may specifically obtain a preset corpus set and perform word segmentation on a sentence in the corpus set, and then learn a preset original model according to a sentence after word segmentation, to obtain the word2vec model.

Content in the corpus set may be set according to requirements of actual applications. For example, UGC within a period, such as UGC in a full year, may be sampled, and network information such as various encyclopedia corpora may be captured, to construct the corpus set. Details are not provided herein again.

Step 206: The server screens, in the video library, the videos similar to the video information according to the word vector of the video text after word segmentation, to obtain the second candidate video set. For example, details may be as follows:

calculating, by the server, similarity between the video information and each video in the video library according to the word vector of the video text after word segmentation; and selecting videos whose similarity is higher than a preset threshold, to obtain the second candidate video set.

The preset threshold may be set according to requirements of actual applications. Similarity between two videos may be obtained by calculating a dot product of word vectors of the two videos or may be calculated according to another similarity algorithm. Details are not described herein.

Step 207: The server determines a similar video for the video information from the first candidate video set and the second candidate video set.

For example, the server may score videos in the first candidate video set and the second candidate video set, calculate a comprehensive score value of each video according to scores, and then, determine a video having a relatively high comprehensive score value, such as a video whose comprehensive score value is greater than a preset score value, as the similar video for the video information.

In some embodiments of this application, to improve flexibility, fine tuning is performed by respectively setting corresponding weights for the videos in the first candidate video set and the second candidate video set, so that a retrieval result is more accurate. That is, the step of "determining, by the server, a similar video for the video information from the first candidate video set and the second candidate video set" may specifically include:

(1) scoring, by the server, the video in the first candidate video set, to obtain a first score value;

(2) scoring, by the server, the video in the second candidate video set, to obtain a second score value;

(3) respectively calculating, by the server, weighted values of the first score value and the corresponding second score value, to obtain a comprehensive score value of each video; and (4) determining, by the server, a video whose comprehensive score value is greater than a preset score value as the similar video for the video information, where this is represented by a formula as follows:

$$S=\alpha*A+\beta*B, \text{ where}$$

S is a comprehensive score value of a video X, A is a first score value of the video X in the first candidate video set, B is a second score value of the video X in the second candidate video set, $\alpha$ is a weight (that is, a weight of a video in the first candidate video set) of the first score value, $\beta$ is a weight (that is, a weight of a video in the second candidate video set) of the second score value, a sum of $\alpha$ and $\beta$ is 1, and specific values of $\alpha$ and $\beta$ may be set through requirements of actual applications, such as through feedback of a user.

It should be noted that score ranges of the first score value and the second score value may be set according to requirements of actual applications, and may be set, for example, between [0,1]. In addition, it should be further noted that if the second candidate video set does not have the video X, the second score value of the video X is 0; similarly, if a video L in the second candidate video set is not in the first candidate video set, a first score value of the video L is 0.

It can be learned from the above that in this embodiment, after the video information for which the similar videos are to be retrieved is obtained, on one hand, the videos matching the video information may be obtained from the video library according to the preset knowledge graph, to obtain the first candidate video set; on the other hand, the video information may be trained by using the preset word2vec model, and the videos similar to the video information are screened in the video library according to a training result, to obtain the second candidate video set, and then similar video for the video information is determined according to the first candidate video set and the second candidate video set, to retrieve the similar video. Because in the solution, the similar video is retrieved by using a solution of combining the knowledge graph and a text similarity, the knowledge graph may be used to fix problems of low recall and large computing resource consumption caused by corpus update frequency and quantity problems, similarity calculation may be used to add context information of a requested video (that is, a video to be retrieved), and a problem of recall result deviation caused by polysemy is stipulated. Therefore, the solution not only improves recall and accuracy of a retrieval result but also reduces frequency of model training and saves computing resources.

To better implement the foregoing method, an embodiment of this application further provides an apparatus for retrieving similar videos. The apparatus for retrieving similar videos may be specifically integrated in a computing device such as a server or a terminal.

Figure 3A:
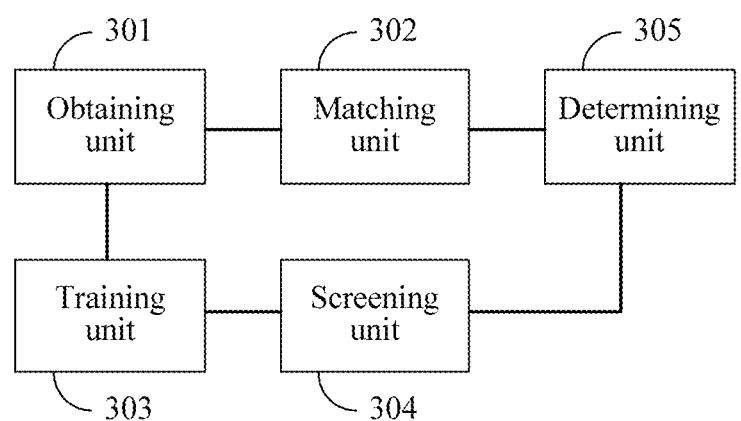
FIG. 3a is a schematic structural diagram of an apparatus for retrieving similar videos according to an embodiment of this application.

For example, as shown in FIG. 3a, the apparatus for retrieving similar videos may include an obtaining unit 301, a matching unit 302, a training unit 303, a screening unit 304, and a determining unit 305.

The obtaining unit 301 is configured to obtain video information for which similar videos are to be retrieved, the video information including a video tag and a video title.

The video information may include information such as the video tag and the video title. The video tag refers to information that may be used for representing video content and/or a video type and information that has an association relationship with the video. The video title refers to title content of the video and may specifically include letters and symbols in the title.

The matching unit 302 is configured to obtain, from a video library according to a preset knowledge graph, videos matching the video information, to obtain a first candidate video set.

For example, the matching unit 302 may include an extraction sub-unit and a matching sub-unit.

The extraction sub-unit may be configured to extract an entity word from the video tag and the video title, to obtain a seed.

The matching sub-unit may be configured to obtain, from the video library according to the preset knowledge graph, videos matching the seed, to obtain the first candidate video set.

For example, the matching sub-unit may be specifically configured to: determine an entity word having a strong association relationship with the seed according to the preset knowledge graph, determine the entity word as a candidate word; and obtain, from the video library, videos whose video information includes the candidate word, to obtain the first candidate video set.

The strong association relationship means that a relationship degree is less than or equal to a set value. That is, if a relationship degree between an entity word and the seed is less than or equal to the set value, it indicates that the entity word and the seed have a strong association relationship. That is, The matching sub-unit may be specifically configured to: map the seed onto entity words in a preset entity library; determine relationship degrees between the seed and the entity words in the entity library; and select an entity word whose relationship degree is less than or equal to a set value as the candidate word, where the entity library may be established according to the preset knowledge graph.

The set value may be set according to requirements of actual applications. For example, an entity whose relationship degree is one degree or two degrees may be generally referred to as an entity having a "close" relationship. Therefore, one degree may be used as the set value.

For example, the seed may be mapped onto a corresponding entity in a preset knowledge base by using an NEL technology or the like, then a quantity of relationship sides between the seed and another entity in the knowledge base is obtained, to obtain a relationship degree between the seed and the another entity in the knowledge base.

Figure 3B:
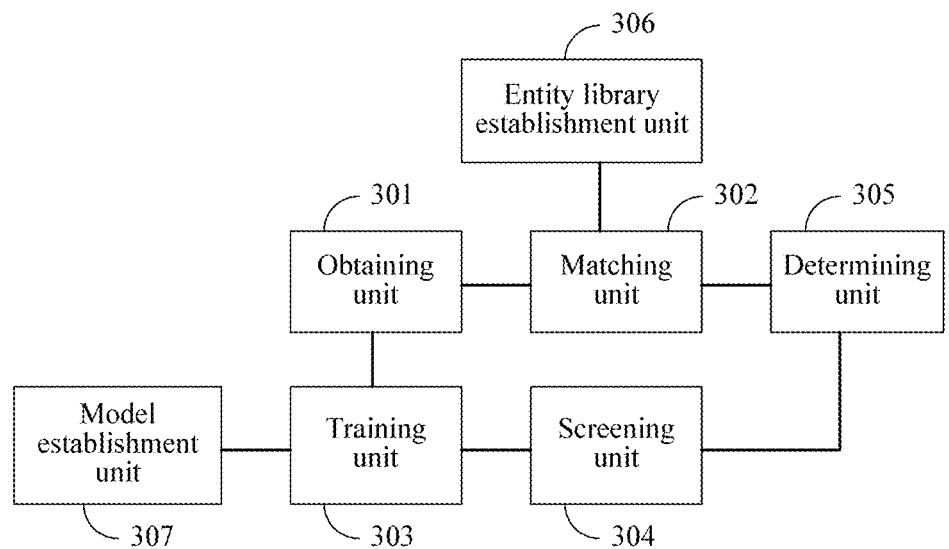
FIG. 3b is another schematic structural diagram of an apparatus for retrieving similar videos according to an embodiment of this application.

In some embodiments of this application, the entity library may be preset by operation and maintenance personnel or may be established by the apparatus for retrieving similar videos. That is, as shown in FIG. 3b, the apparatus for retrieving similar videos may further include an entity library establishment unit 306.

The entity library establishment unit 306 may be configured to set a basic thesaurus; obtain Internet information according to the basic thesaurus and perform non-entity word cleaning on the Internet information; and construct a triple relationship between the entity words according to the basic thesaurus and cleaned Internet information, to obtain the entity library.

For example, the entity library establishment unit 306 may specifically obtain basic classifying entity words from cell thesauri of some applications. For example, a star, a film, or the like is used as a basic thesaurus, and then Internet information is obtained according to the basic thesaurus. For example, some web pages containing encyclopedia data may be obtained, non-entity words in these web pages are cleaned, and triple relationships between entity words are constructed, to obtain an entity library in which these triple relationships are stored.

It should be noted that to ensure accuracy of a retrieval result, the entity library establishment unit 306 may further update the basic thesaurus and the Internet information periodically or in real time, to update the entity library. For details, refer to descriptions in the foregoing embodiment. Details are not described herein again.

The training unit 303 is configured to train the video information by using a preset word2vec model, to convert the video information into a word vector.

For example, the training unit 303 may be specifically configured to: perform word segmentation on the video tag and the video title, to obtain video text after word segmentation; and train the video text after word segmentation by using the preset word2vec model, to obtain a word vector of the video text after word segmentation.

The word2vec model may be preset by operation and maintenance personnel or may be pre-established by the apparatus for retrieving similar videos. That is, as shown in FIG. 3b, the apparatus for retrieving similar videos may further include a model establishment unit 307 as follows:

The model establishment unit 307 may be configured to: obtain a preset corpus set and perform word segmentation on a sentence in the corpus set; and learn a preset original model according to a sentence after word segmentation, to obtain the word2vec model.

Content in the corpus set may be set according to requirements of actual applications. For example, UGC within a period may be sampled, and network information such as various encyclopedia corpora may be captured, to construct the corpus set. For details, refer to the foregoing embodiments. Details are not provided herein again.

The screening 304 is configured to screen, in the video library, videos similar to the video information according to the word vector, to obtain a second candidate video set.

For example, if the training unit 303 obtains the word vector of the video text after word segmentation through training, the screening unit 304 may screen, in the video library, the videos similar to the video information according to the word vector of the video text after word segmentation, to obtain the second candidate video set. For example, details may be as follows:

The screening unit 304 may be specifically configured to: calculate similarity between the video information and each video in the video library according to the word vector of the video text after word segmentation; and select videos whose similarity is higher than a preset threshold, to obtain the second candidate video set.

The preset threshold may be set according to requirements of actual applications. Similarity between two videos may be obtained by calculating a dot product of word vectors of the two videos or may be calculated according to another similarity algorithm.

The determining unit 305 is configured to determine a similar video for the video information from the first candidate video set and the second candidate video set.

For example, the determining unit 305 may be specifically configured to: score each video in the first candidate video set, to obtain a first score value; score each video in the second candidate video set, to obtain a second score value; respectively calculate weighted values of the first score value and the corresponding second score value, to obtain a comprehensive score value of each video; and determine a video whose comprehensive score value is greater than a preset score value as the similar video for the video information. For details, refer to the foregoing embodiments. Details are not described herein again.

During specific implementation, the foregoing units may be implemented as independent entities, or may be randomly combined, or may be implemented as a same entity or several entities. For specific implementation of the foregoing units, refer to the foregoing method embodiments. Details are not described herein again.

It can be learned from the above that in this embodiment, after the apparatus for retrieving similar videos provided in this embodiment obtains the video information for which the similar videos are to be retrieved, on one hand, the matching unit 302 may obtain, from the video library according to the preset knowledge graph, the videos matching the video information, to obtain the first candidate video set; on the other hand, the training unit 303 may train the video information by using the preset word2vec model, to convert the video information into a word vector, and the screening unit 304 screens, in the video library, the videos similar to the video information according to the word vector, to obtain the second candidate video set, and then the determining unit 305 determines the similar video for the video information according to the first candidate video set and the second candidate video set, to retrieve the similar video. Because in the solution, the similar video is retrieved by using a solution of combining the knowledge graph and a text similarity, the knowledge graph may be used to fix problems of low recall and large computing resource consumption caused by corpus update frequency and quantity problems, similarity calculation may be used to add context information of a requested video (that is, a video to be retrieved), and a problem of recall result deviation caused by polysemy is stipulated. Therefore, the solution not only improves recall and accuracy of a retrieval result but also reduces frequency of model training and saves computing resources.

Figure 4:
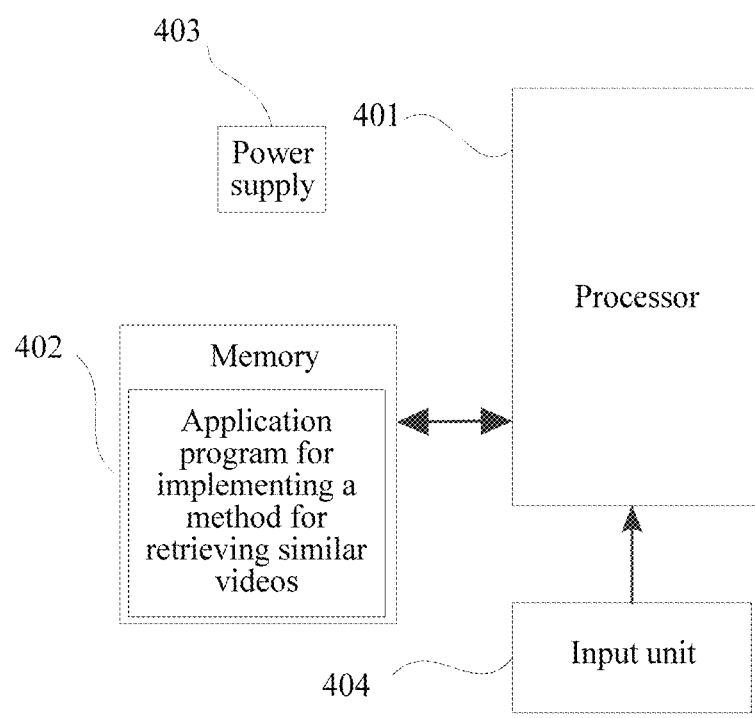
FIG. 4 is a schematic structural diagram of a computing device according to an embodiment of the present invention.

An embodiment of this application further provides a computing device (as the server described above). As shown in FIG. 4, FIG. 4 is a schematic structural diagram of a computing device in an embodiment of this application, specifically:

The computing device may include components such as a processor 401 of one or more processing cores, a memory 402 of one or more computer readable storage media, a power supply 403, and an input unit 404. A person skilled in the art may understand that a structure of the computing device shown in FIG. 4 does not constitute a limitation to the computing device, and the wearable device may include more components or fewer components than those shown in the figure, or some components may be combined, or a different component deployment may be used.

The processor 401 is a control center of the computing device, and connects to various parts of the entire computing device by using various interfaces and lines. By running or executing software programs and/or modules stored in the memory 402, and invoking data stored in the memory 402, the processor 401 performs various functions and data processing of the computing device, thereby performing overall monitoring on the computing device. In some embodiments of this application, the processor 401 may include the one or more processing cores; the processor 401 may integrate an application processor and a modem processor. The application processor mainly processes an operating system, a user interface, an application program, and the like. The modem processor mainly processes wireless communication. It may be understood that the foregoing modem processor may alternatively not be integrated into the processor 401.

The memory 402 may be configured to store a software program and module. The processor 401 runs the software program and module stored in the memory 402, to implement various functional applications and data processing. The memory 402 may mainly include a program storage area and a data storage area. The program storage area may store an operating system, an application program required by at least one function (such as a sound playing function and an image display function), and the like. The data storage area may store data created according to use of the server, and the like. In addition, the memory 402 may include a high-speed random access memory, and may further include a non-volatile memory such as at least one magnetic disk storage device or a flash memory device, or another volatile solid storage device. Correspondingly, the memory 402 may further include a memory controller, to provide access of the processor 401 to the memory 402.

The computing device further includes the power supply 403 for supplying power to the components. In some embodiments of this application, the power supply 403 may be logically connected to the processor 401 by using a power supply management system, thereby implementing functions, such as charging, discharging, and power consumption management, by using the power supply management system. The power supply 403 may further include one or more of a direct current or alternating current power supply, a re-charging system, a power failure detection circuit, a power supply converter or inverter, a power supply state indicator, and any other component.

The computing device may further include the input unit 404. The input unit 404 may be configured to receive entered numeric or character information and generate keyboard, mouse, joystick, optical, or trackball signal input related to user settings and function control.

Although not shown in the figure, the computing device may further include a display unit, and the like. Details are not described herein again. Specifically, in this embodiment, the processor 401 in the computing device may load, according to the following instructions, executable files (machine readable instructions) corresponding to processes of one or more application programs into the memory 402. The processor 401 runs the machine readable instructions (such as application programs for implementing the foregoing method for retrieving similar videos) stored in the memory 402, to implement the following various functions:

obtaining video information of a video for which similar videos are to be retrieved, the video information including a video tag and a video title; obtaining, from a video library according to a preset knowledge graph, videos matching the video information, to obtain a first candidate video set; training the video information by using a preset word2vec model, to convert the video information into a word vector; screening, in the video library, videos similar to the video information according to the word vector, to obtain a second candidate video set; and determining a similar video for the video information from the first candidate video set and the second candidate video set.

The processor 401 executes the machine readable instructions stored in the memory 402 to complete the following operations:

extracting an entity word from the video tag and the video title, to obtain a seed; then obtaining, from the video library according to the preset knowledge graph, videos matching the seed, to obtain the first candidate video set; performing word segmentation on the video tag and the video title, to obtain video text after word segmentation; training the video text after word segmentation by using the preset word2vec model, to obtain a word vector of the video text after word segmentation; and then screening, in the video library, the videos similar to the video information according to the word vector of the video text after word segmentation, to obtain the second candidate video set.

The word2vec model may be preset by operation and maintenance personnel or may be pre-established by the computing device. That is, the processor 401 may also run application programs (that is, the machine readable instructions) stored in the memory 402, to implement the following function:

obtaining a preset corpus set and performing word segmentation on a sentence in the corpus set; and learning a preset original model according to a sentence after word segmentation, to obtain the word2vec model.

Content in the corpus set may be set according to requirements of actual applications. For example, UGC within a period may be sampled, and network information such as various encyclopedia corpora may be captured, to construct the corpus set.

For specific implementations of the foregoing operations, refer to the foregoing embodiments. Details are not described herein again.

It can be learned from the above that after the computing device in this embodiment obtains the video information for which the similar videos are to be retrieved, on one hand, the videos matching the video information may be obtained from the video library according to the preset knowledge graph, to obtain the first candidate video set; on the other hand, the video information may be trained by using the preset word2vec model, to convert the video information into the word vector, and the videos similar to the video information are screened in the video library according to the word vector, to obtain the second candidate video set, and then similar video for the video information is determined according to the first candidate video set and the second candidate video set, to retrieve the similar video. Because in the solution, the similar video is retrieved by using a solution of combining the knowledge graph and a text similarity, the knowledge graph may be used to fix problems of low recall and large computing resource consumption caused by corpus update frequency and quantity problems, similarity calculation may be used to add context information of a requested video (that is, a video to be retrieved), and a problem of recall result deviation caused by polysemy is stipulated. Therefore, the solution not only improves recall and accuracy of a retrieval result but also reduces frequency of model training and saves computing resources.

A person of ordinary skill in the art would understand that all or some of steps in various methods in the foregoing embodiments can be completed through instructions or completed through hardware related to instruction control. The instructions may be stored in a non-volatile computer readable storage medium and loaded and executed by the processor.

For this, an embodiment of this application provides a storage medium, storing a plurality of machine readable instructions, where the machine readable instructions can be loaded by the processor, to perform steps in any method for retrieving similar videos provided in the embodiments of this application. For example, the machine readable instructions may be executed by the processor to complete the following operations:

obtaining video information of a video for which similar videos are to be retrieved, the video information including a video tag and a video title; obtaining, from a video library according to a preset knowledge graph, videos matching the video information, to obtain a first candidate video set; training the video information by using a preset word2vec model, to convert the video information into a word vector; screening, in the video library, videos similar to the video information according to the word vector, to obtain a second candidate video set; and determining a similar video for the video information from the first candidate video set and the second candidate video set.

For specific implementations of the foregoing operations, refer to the foregoing embodiments. Details are not described herein again.

The storage medium may include: a read-only memory (ROM), a random access memory (RAM), a magnetic disk, or an optical disc.

Because the instructions stored in the storage medium can perform steps in any method for retrieving similar videos provided in the embodiments of this application, the instructions can implement beneficial effects achieved by any method for retrieving similar videos provided in the embodiments of this application. For details, refer to the foregoing embodiments. Details are not described herein again.

The method and apparatus for retrieving similar videos, and the storage medium provided in the embodiments of this application are described above in detail. Although the principles and implementations of this application are described by using specific embodiments in the specification, the foregoing descriptions of the embodiments are only intended to help understand the method and core idea of the method of this application. Meanwhile, a person of ordinary skill in the art may make modifications to the specific implementations and application range according to the idea of this application. In conclusion, the content of the specification should not be construed as a limitation to this application.

What is claimed is:

1. A method for retrieving similar videos performed at a computing device having one or more processors and memory storing a plurality of programs to be executed by the one or more processors, the method comprising:
   obtaining video information of a video for which similar videos are to be retrieved, the video information comprising a video tag and a video title;
   selecting, from a video library according to a preset knowledge graph, videos matching the video information, to obtain a first candidate video set;
   training the video information by using a preset text depth representation model, to convert the video information into a word vector;
   screening, in the video library, videos similar to the video information according to the word vector, to obtain a second candidate video set; and
   determining a similar video for the video information from the first candidate video set and the second candidate video set.

2. The method according to claim 1, wherein the determining a similar video for the video information from the first candidate video set and the second candidate video set comprises:
   scoring each video in the first candidate video set, to obtain a first score value;
   scoring each video in the second candidate video set, to obtain a second score value;
   respectively calculating weighted values of the first score value and the corresponding second score value, to obtain a comprehensive score value of each video; and
   determining a video whose comprehensive score value is greater than a preset score value as the similar video for the video information.

3. The method according to claim 1, wherein the training the video information by using a preset text depth representation model, to convert the video information into a word vector comprises:
   performing word segmentation on the video tag and the video title, to obtain video text after word segmentation; and
   training the video text after word segmentation by using the preset text depth representation model, to obtain a word vector of the video text after word segmentation; and
   the screening, in the video library, videos similar to the video information according to the word vector, to obtain a second candidate video set further comprises:
   screening, in the video library, the videos similar to the video information according to the word vector of the video text after word segmentation, to obtain the second candidate video set.

4. The method according to claim 3, wherein the screening, in the video library, the videos similar to the video information according to the word vector of the video text after word segmentation, to obtain the second candidate video set comprises:
   calculating similarity between the video information and each video in the video library according to the word vector of the video text after word segmentation; and
   selecting videos whose similarity is higher than a preset threshold, to obtain the second candidate video set.

5. The method according to claim 3, further comprising:
   before training the video text after word segmentation by using the preset text depth representation model:
      obtaining a preset corpus set and performing word segmentation on a sentence in the corpus set; and
      learning a preset original model according to a sentence after word segmentation, to obtain the text depth representation model.

6. The method according to claim 1, wherein the selecting, from a video library according to a preset knowledge graph, videos matching the video information, to obtain a first candidate video set comprises:
   extracting an entity word from the video tag and the video title, to obtain a seed; and
   selecting, from the video library according to the preset knowledge graph, videos matching the seed, to obtain the first candidate video set.

7. The method according to claim 6, wherein the selecting, from the video library according to the preset knowledge graph, videos matching the seed, to obtain the first candidate video set comprises:
   selecting an entity word having a strong association relationship with the seed according to the preset knowledge graph as a candidate word; and
   selecting, from the video library, videos whose video information comprises the candidate word, to obtain the first candidate video set.

8. The method according to claim 7, wherein the selecting an entity word having a strong association relationship with the seed according to the preset knowledge graph as a candidate word comprises:
   mapping the seed onto entity words in a preset entity library, the entity library being established according to the preset knowledge graph;
   determining relationship degrees between the seed and the entity words in the entity library; and
   selecting an entity word whose relationship degree is less than or equal to a set value as the candidate word.

9. The method according to claim 8, further comprising:
   before mapping the seed onto entity words in a preset entity library,
      setting a basic thesaurus;
      obtaining Internet information according to the basic thesaurus and performing non-entity word cleaning on the Internet information; and
      constructing a triple relationship between the entity words according to the basic thesaurus and cleaned Internet information, to obtain the preset entity library.

10. A computing device comprising one or more processors, memory coupled to the one or more processors and a plurality of programs stored in the memory that, when executed by the one or more processors, cause the computing device to perform a plurality of operations comprising:
   obtaining video information of a video for which similar videos are to be retrieved, the video information comprising a video tag and a video title;
   selecting, from a video library according to a preset knowledge graph, videos matching the video information, to obtain a first candidate video set;
   training the video information by using a preset text depth representation model, to convert the video information into a word vector;
   screening, in the video library, videos similar to the video information according to the word vector, to obtain a second candidate video set; and determining a similar video for the video information from the first candidate video set and the second candidate video set.

11. The computing device according to claim 10, wherein the determining a similar video for the video information from the first candidate video set and the second candidate video set comprises:
   scoring each video in the first candidate video set, to obtain a first score value;
   scoring each video in the second candidate video set, to obtain a second score value;
   respectively calculating weighted values of the first score value and the corresponding second score value, to obtain a comprehensive score value of each video; and
   determining a video whose comprehensive score value is greater than a preset score value as the similar video for the video information.

12. The computing device according to claim 10, wherein the training the video information by using a preset text depth representation model, to convert the video information into a word vector comprises:
   performing word segmentation on the video tag and the video title, to obtain video text after word segmentation; and
   training the video text after word segmentation by using the preset text depth representation model, to obtain a word vector of the video text after word segmentation; and
   the screening, in the video library, videos similar to the video information according to the word vector, to obtain a second candidate video set further comprises:
   screening, in the video library, the videos similar to the video information according to the word vector of the video text after word segmentation, to obtain the second candidate video set.

13. The computing device according to claim 12, wherein the screening, in the video library, the videos similar to the video information according to the word vector of the video text after word segmentation, to obtain the second candidate video set comprises:
   calculating similarity between the video information and each video in the video library according to the word vector of the video text after word segmentation; and
   selecting videos whose similarity is higher than a preset threshold, to obtain the second candidate video set.

14. The computing device according to claim 10, wherein the selecting, from a video library according to a preset knowledge graph, videos matching the video information, to obtain a first candidate video set comprises:
   extracting an entity word from the video tag and the video title, to obtain a seed; and
   selecting, from the video library according to the preset knowledge graph, videos matching the seed, to obtain the first candidate video set.

15. The computing device according to claim 14, wherein the selecting, from the video library according to the preset knowledge graph, videos matching the seed, to obtain the first candidate video set comprises:
   selecting an entity word having a strong association relationship with the seed according to the preset knowledge graph as a candidate word; and
   selecting, from the video library, videos whose video information comprises the candidate word, to obtain the first candidate video set.

16. The computing device according to claim 15, wherein the selecting an entity word having a strong association relationship with the seed according to the preset knowledge graph as a candidate word comprises:
   mapping the seed onto entity words in a preset entity library, the entity library being established according to the preset knowledge graph;
   determining relationship degrees between the seed and the entity words in the entity library; and
   selecting an entity word whose relationship degree is less than or equal to a set value as the candidate word.

17. A non-transitory computer readable storage medium storing a plurality of machine readable instructions in connection with a computing device having one or more processors, wherein the plurality of machine readable instructions, when executed by the one or more processors, cause the computing device to perform a plurality of operations including:
   obtaining video information of a video for which similar videos are to be retrieved, the video information comprising a video tag and a video title;
   selecting, from a video library according to a preset knowledge graph, videos matching the video information, to obtain a first candidate video set;
   training the video information by using a preset text depth representation model, to convert the video information into a word vector;
   screening, in the video library, videos similar to the video information according to the word vector, to obtain a second candidate video set; and
   determining a similar video for the video information from the first candidate video set and the second candidate video set.

18. The non-transitory computer readable storage medium according to claim 17, wherein the selecting, from a video library according to a preset knowledge graph, videos matching the video information, to obtain a first candidate video set comprises:
   extracting an entity word from the video tag and the video title, to obtain a seed; and
   selecting, from the video library according to the preset knowledge graph, videos matching the seed, to obtain the first candidate video set.

19. The non-transitory computer readable storage medium according to claim 18, wherein the selecting, from the video library according to the preset knowledge graph, videos matching the seed, to obtain the first candidate video set comprises:
   selecting an entity word having a strong association relationship with the seed according to the preset knowledge graph as a candidate word; and
   selecting, from the video library, videos whose video information comprises the candidate word, to obtain the first candidate video set.

20. The non-transitory computer readable storage medium according to claim 19, wherein the selecting an entity word having a strong association relationship with the seed according to the preset knowledge graph as a candidate word comprises:
   mapping the seed onto entity words in a preset entity library, the entity library being established according to the preset knowledge graph;
   determining relationship degrees between the seed and the entity words in the entity library; and
   selecting an entity word whose relationship degree is less than or equal to a set value as the candidate word.

* * * * *